(12) United States Patent
Schroll et al.

(10) Patent No.: US 6,968,103 B1
(45) Date of Patent: Nov. 22, 2005

(54) OPTICAL FIBER COUPLER AND METHOD FOR MAKING SAME

(75) Inventors: Kenneth R. Schroll, Chatham, NJ (US); James P. Waters, Boonton Township, NJ (US); Richard T. Kane, Morristown, NJ (US); Peter M. Fried, Madison, NJ (US); Janet Mrotek, Somerset, NJ (US)

(73) Assignee: General Dynamics Advanced Information Systems, Inc., Arlington, VA (US)

( * ) Notice: Subject to any disclaimer, the term of this patent is extended or adjusted under 35 U.S.C. 154(b) by 106 days.

(21) Appl. No.: 10/268,461

(22) Filed: Oct. 10, 2002

(51) Int. Cl.[7] .................................................. G02B 6/26
(52) U.S. Cl. ............................... 385/30; 385/27; 385/42; 385/50
(58) Field of Search .............................. 385/25, 27, 30, 385/31, 39, 42, 50, 51

(56) References Cited

U.S. PATENT DOCUMENTS

| | | | | |
|---|---|---|---|---|
| 4,387,954 A | * | 6/1983 | Beasley ........................ | 385/30 |
| 4,431,260 A | * | 2/1984 | Palmer ......................... | 385/51 |
| 4,511,207 A | * | 4/1985 | Newton et al. ................ | 385/24 |
| 4,536,058 A | * | 8/1985 | Shaw et al. .................... | 385/30 |
| 4,564,262 A | * | 1/1986 | Shaw ............................ | 385/30 |
| 4,626,652 A | * | 12/1986 | Bjork et al. ........... | 219/121.68 |
| 4,723,827 A | * | 2/1988 | Shaw et al. .................... | 385/25 |
| 4,738,511 A | * | 4/1988 | Fling ............................ | 385/30 |
| 4,753,497 A | * | 6/1988 | Fujii et al. .................... | 385/42 |
| 4,896,932 A | * | 1/1990 | Cassidy ........................ | 385/50 |
| 5,029,961 A | * | 7/1991 | Suzuki et al. ................. | 385/50 |
| 5,042,896 A | * | 8/1991 | Dahlgren ...................... | 385/31 |
| 5,421,928 A | * | 6/1995 | Knecht et al. ............... | 156/153 |
| 5,533,155 A | * | 7/1996 | Barberio et al. .............. | 385/30 |
| 5,778,119 A | * | 7/1998 | Farries ......................... | 385/37 |
| 6,011,881 A | * | 1/2000 | Moslehi et al. ............... | 385/10 |
| 6,026,205 A | * | 2/2000 | McCallion et al. ........... | 385/30 |
| 6,366,726 B1 | * | 4/2002 | Wach et al. ................. | 385/115 |
| 6,509,547 B1 | | 1/2003 | Bernstein et al. | |
| 2002/0028040 A1 | * | 3/2002 | Tseng et al. .................... | 385/30 |
| 2004/0004710 A1 | * | 1/2004 | Katakura et al. ........... | 356/73.1 |

FOREIGN PATENT DOCUMENTS

JP 54101334 A * 8/1979 ............ G02B/5/14

* cited by examiner

*Primary Examiner*—Ellen E. Kim
(74) *Attorney, Agent, or Firm*—Howrey Simon Arnold & White, LLP

(57) ABSTRACT

A first optical fiber is coupled to a second optical fiber by ablating a portion of the cladding from the first and second optical fibers, thus exposing or nearly exposing the fibers' cores, bringing the ablated regions close together in the presence of an optical couplant, adjusting the alignment of the fibers so as to achieve a desired optical coupling ratio, and securing the fibers relative to each other. The ablation can be accomplished using a laser. The fibers can be secured mechanically or using adhesives. The finished coupler can be sleeved or otherwise encapsulated for physical protection. The technique can be applied to pairs of fiber ribbons, each having multiple optical fibers.

20 Claims, 16 Drawing Sheets

OPTICAL FIBER COUPLER AND METHOD FOR MAKING SAME

BACKGROUND OF THE INVENTION

1. The Technical Field

This invention relates generally to fiber optics. More particularly, it relates to optical fiber couplers and methods for making such couplers.

2. The Prior Art

The explosion of demand for bandwidth has resulted in fiber optic communication cables containing multiple fiber ribbons, with each such ribbon typically including twelve or twenty-four fibers and 48-fiber ribbons being contemplated. Accordingly, there is a need for large numbers of ribbon couplers in central offices, branch offices and numerous other sites throughout the new high-bandwidth optical networks now being installed.

Devices and procedures for optically coupling single optical fibers are known in the art. For example, U.S. Pat. No. 4,626,652 for a "Method and Means of Removing Claddings from Optical Fibers" describes a process for using a laser to ablate the cladding from one side of an optical fiber to nearly expose the core region, as illustrated in FIG. 1. In this process, light is transmitted in the core of the fiber during the ablation step, while the "throughput" of the fiber is monitored. The ablation is stopped when the throughput changes by a predetermined amount to indicate that the core is nearly exposed. Two fibers prepared in this way are bent and placed with their flats together as shown in FIG. 2. The two fibers then are heated to near-melting and fused together, as shown in FIG. 3. During the fusing step, the two fibers are pulled (like taffy), necking them down until the desired power division is achieved.

Another procedure (not illustrated) for coupling a single pair of optical fibers, and one that represents common commercial practice involves: (1) removing the coating from a portion of each of two optical fibers; (2) twisting the uncoated fiber sections about each other; (3) heating the twisted section until the fibers soften; and (4) drawing the twisted glass structure axially to reduce the diameter thereof. Alternatively, the process involves placing the two stripped fibers inside a glass tube and then heating and drawing the composite structure. In either case, when the fiber diameters are sufficiently reduced, the evanescent fields of the two fibers overlap, and some portion of the light propagating in one fiber couples into the second fiber. During the drawing process, light can be propagated in one of the fibers, and the fraction of light coupled over to the other fiber can be monitored to control the process and produce couplers with specified coupling performance.

Single fiber coupler technology is not readily applied to multiple fiber applications, and particularly ribbon fiber applications, for several reasons. For one thing, the use of multiple single-fiber couplers on large numbers of ribbons is prohibitive in practice in that it requires a large amount of space, which is at a premium in most applications. Further, the foregoing processes of heating and drawing the two bare fibers together yield couplers which are very fragile and prone to damage, especially when used in congested environments. Also, simultaneously drawing all the fiber pairs in a pair of ribbon fibers is not likely to produce uniform couplers having the same coupling ratio because small variations in the core interaction are likely to occur from coupler to coupler.

SUMMARY OF THE INVENTION

The present invention solves the problem of economically fabricating substantially identical high-efficiency couplers simultaneously on all of the optical fibers in a fiber ribbon used in, for example, test and access applications in the telecommunications industry. A twelve or twenty-four fiber ribbon coupler according to the present invention could have a volume of a few $cm^3$. The installation of ribbon couplers should be much quicker and therefore much less expensive on a per-fiber basis than installing multiple single fiber couplers. Indeed, the cost of fabricating a ribbon coupler as a packaged component may be comparable to that for fabricating a single fiber coupler.

The present invention can be practiced on pairs of single fibers or on ribbon fibers. In a typical single fiber-pair embodiment, the protective coating is removed from a short length of the two optical fibers to be coupled. The coating removal can be by chemical, mechanical, or other suitable means. The bare sections of the fibers are mounted on respective curved substrates using mechanical clamps, vacuum chuck, adhesives, or any other suitable means. The cladding is ablated from one side of the bare sections of the fibers to nearly expose the core regions of the respective fibers. The ablation preferably is performed using a laser, such as a pulsed $CO_2$ laser. Alternatively, mechanical or other suitable ablation means could be used.

An optical coupling material is applied to one or both of the ablated fiber sections, and the ablated fiber sections are brought close together. The ablated fiber sections are aligned to yield the desired coupling effect and then are fixed in position using, for example, adhesives or mechanical means. The resulting coupler can be enclosed in a sleeve or other package to protect it from the environment and rough handling.

A ribbon fiber coupler can be fabricated in a similar manner. The protective coating is removed from a short length of the optical fibers comprising the fiber ribbons to be coupled. The bare sections of the fibers are mounted on respective curved substrates using mechanical clamps, vacuum chuck, adhesives, or any other suitable means. The individual fibers should be parallel and precisely spaced. The individual fibers can be located within silicon v-groove chips in order to facilitate this alignment. The cladding is ablated from one side of the bare sections of the fibers to nearly expose the core regions of the respective fibers. The ablation can be performed one fiber at a time, or multiple fibers can be ablated simultaneously. A lensed laser can be used to perform the ablation.

An optical coupling material is applied to the ablated fiber sections of one or both ribbons, and the ribbons are brought close together so that optical coupling occurs between corresponding fibers among the two ribbons. The ribbons, and, thus, the corresponding, ablated fiber sections, are aligned to yield the desired coupling effect between corresponding fiber pairs and then are fixed in position using, for example, adhesives or mechanical means. The resulting ribbon coupler can be enclosed in a sleeve or other package to protect it from the environment and rough handling.

DETAILED DESCRIPTION OF THE DRAWINGS

The techniques of the present invention can be applied to both single fiber couplers (couplers for joining a single pair of fibers) and multiple fiber couplers (couplers for joining multiple pairs of fibers). These techniques are particularly well-suited for use in fabricating ribbon fiber couplers. A preferred single-fiber embodiment will be discussed first, followed by a description of a preferred ribbon fiber embodiment.

Optical fiber typically is supplied with a protective coating covering the fiber cladding. According to a preferred embodiment of the present invention, this protective coating must be removed from a portion of each of the fibers to be coupled. This coating removal can be accomplished by conventional techniques, such as immersion in hot sulfuric acid. Alternatively, the coating can be removed directly using a pulsed $CO_2$ laser beam of appropriate power density, preferably in a single pass. Other types of lasers also can be used. However, the hot acid technique is preferred because it generally yields the best results in terms of fiber strength.

Figure 1:
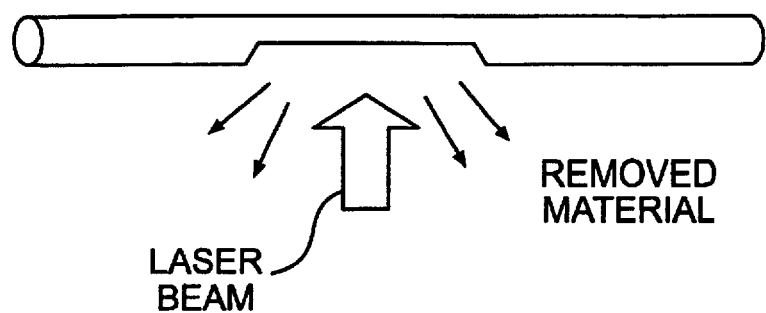
FIG. 1 illustrates a step of a prior art process for fabricating an optical fiber coupler.
Figure 2:
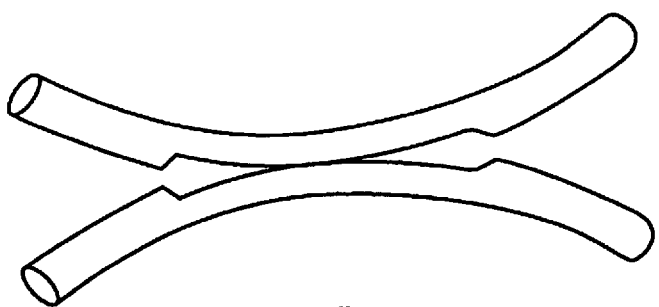
FIG. 2 illustrates another step of a prior art process for fabricating an optical fiber coupler.
Figure 3:
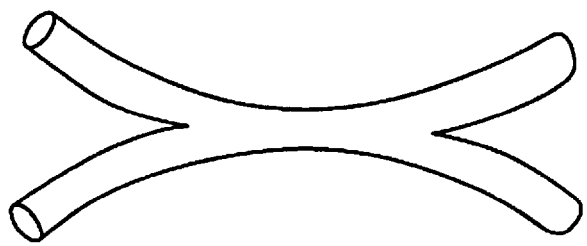
FIG. 3 illustrates yet another step of a prior art process for fabricating an optical fiber coupler.
Figure 4:
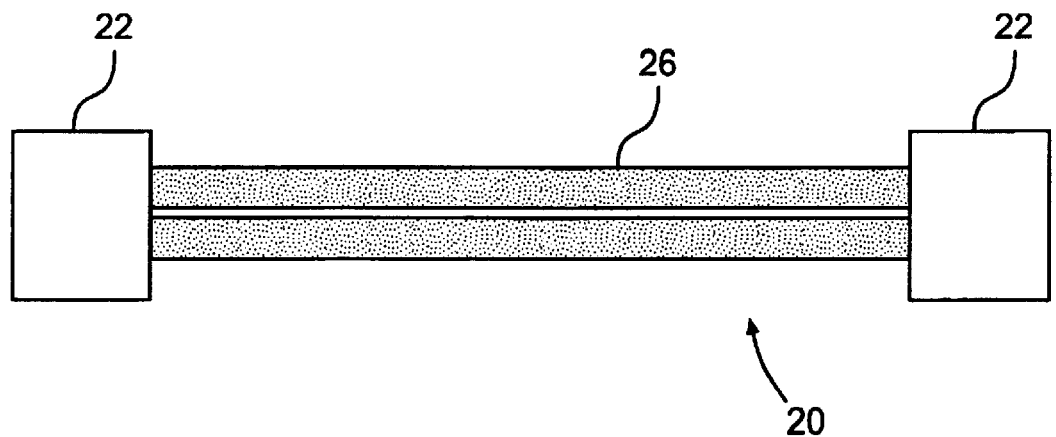
FIG. 4 illustrates an optical fiber with a portion of its protective coating removed.
Figure 5:
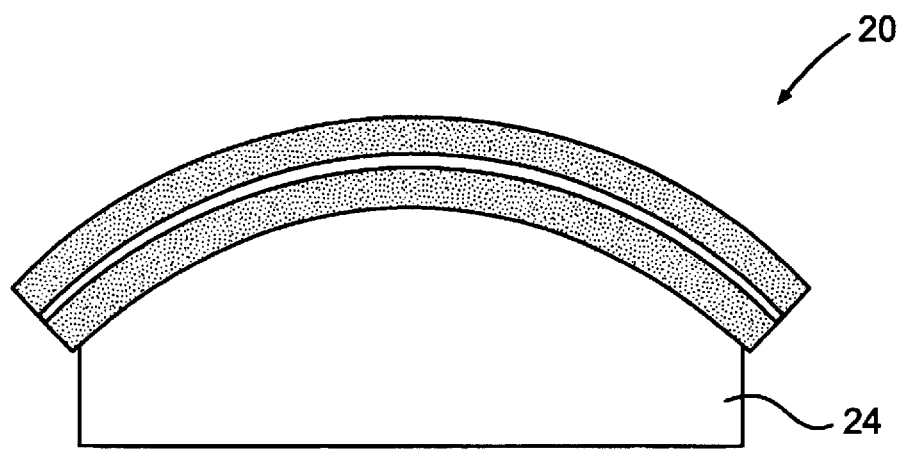
FIG. 5 illustrates a section of optical fiber from which the protective coating has been removed, bent over a curved substrate.

FIG. 4 illustrates a first optical fiber 20 from which a portion (typically a 15–25 mm length) of the protective coating 22 has been removed so as to expose the underlying cladding 26. As shown in FIG. 5, the bare section of fiber 20 is mounted on a curved substrate 24 using an adhesive (not shown) or other suitable hold-down means, such as mechanical clamps, vacuum chucks, etc. (not shown). Preferably, the radius of curved substrate 24 is large enough (10–15 cm for a fiber having a 125 mm cladding diameter) to keep fiber bending stresses low.

Next, a pulsed $CO_2$ laser beam 28 or other suitable laser is scanned linearly back and forth along the top (curved) surface of optical fiber 20 to incrementally ablate a portion of the cladding 26 on one side of the fiber, as illustrated in FIGS. 6A–7B. Mechanical means, such as polishing or lapping, can be used to ablate the cladding, but use of a laser for this purpose is preferred. Ablating a fiber mounted on a curved substrate has several advantages over the prior art approach of ablating a straight fiber. For example: (i) there is no need to apply tension (which must be precisely controlled) to the fiber to keep it straight; (ii) control of the laser traverse is simpler; and (iii) the incidence of stress concentrations (such as those that occur in the "comers" of the ablated region when using the straight-fiber approach) where cracks tend to start, eventually leading to fiber failure, is reduced or eliminated altogether.

Figure 6A:
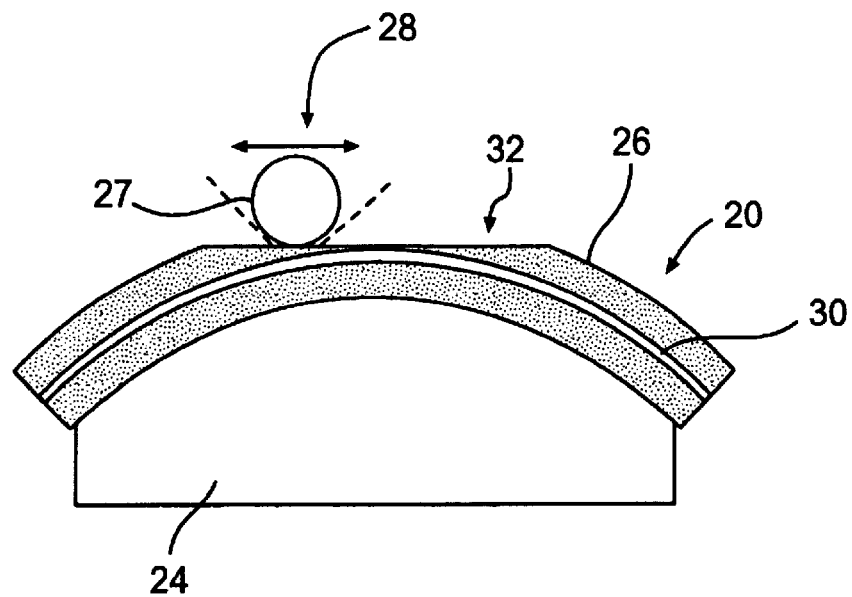
FIGS. 6A–6C illustrate the use of a laser to ablate the cladding from one side of the optical fiber illustrated in FIG. 5 according to a so-called side mill technique.
Figure 6B:
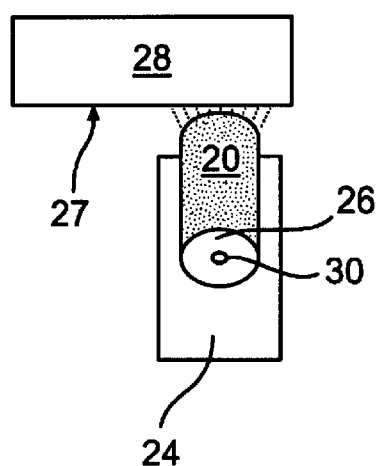
Figure 7A:
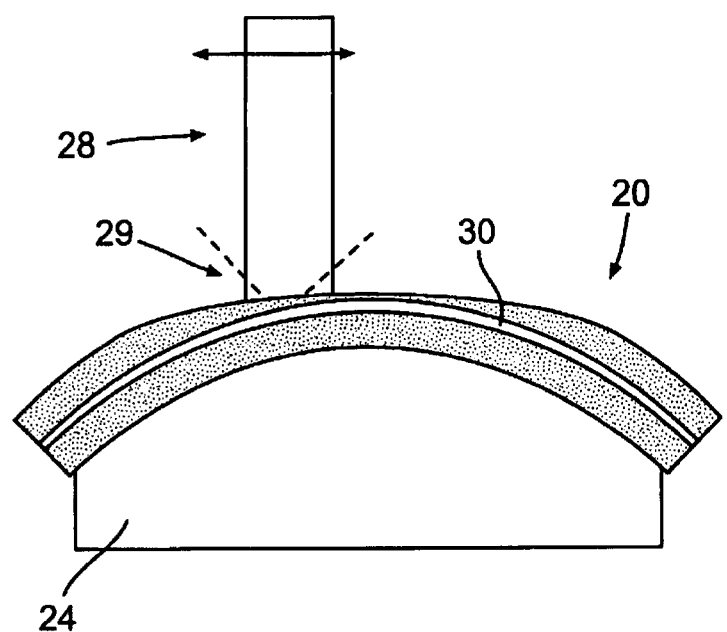
FIGS. 7A and 7B illustrate the use of a laser to ablate the cladding from one side of the optical fiber illustrated in FIG. 5 according to a so-called end mill technique.
Figure 7B:
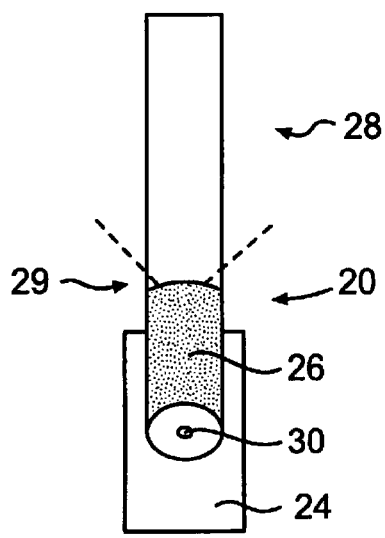
Figure 8A:
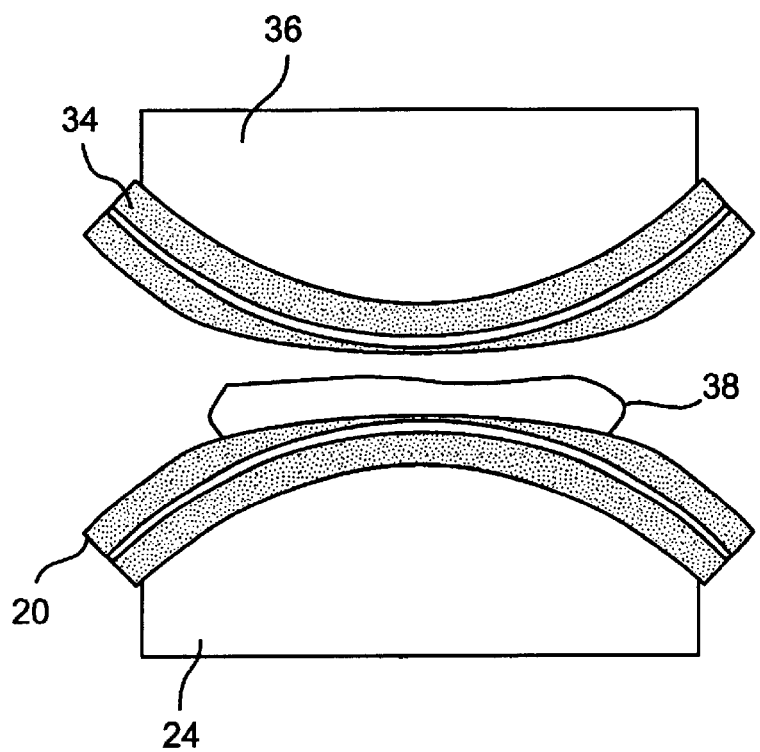
FIGS. 8A and 8B illustrate an optical coupling material applied to the ablated region of an optical fiber.
Figure 8B:
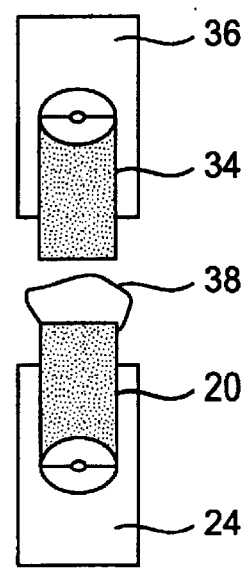

The laser ablation process can use, for example, the "side mill" approach shown in FIGS. 6A and 6B or the "end mill" approach shown in FIGS. 7A and 7B. Using the side mill approach, the circumferential edge 27 of laser beam 28 incrementally ablates cladding 26. The path of laser beam 28 is stepped closer to the fiber core 30 in successive passes, typically in increments of a few microns or less. When used to ablate a single fiber, the side mill technique yields a nearly planar surface 32 just above the fiber core 30. Because of its simplicity and the desirable results it produces, the side mill technique is the conventional approach to ablating a single fiber using a laser beam.

Figure 6C:
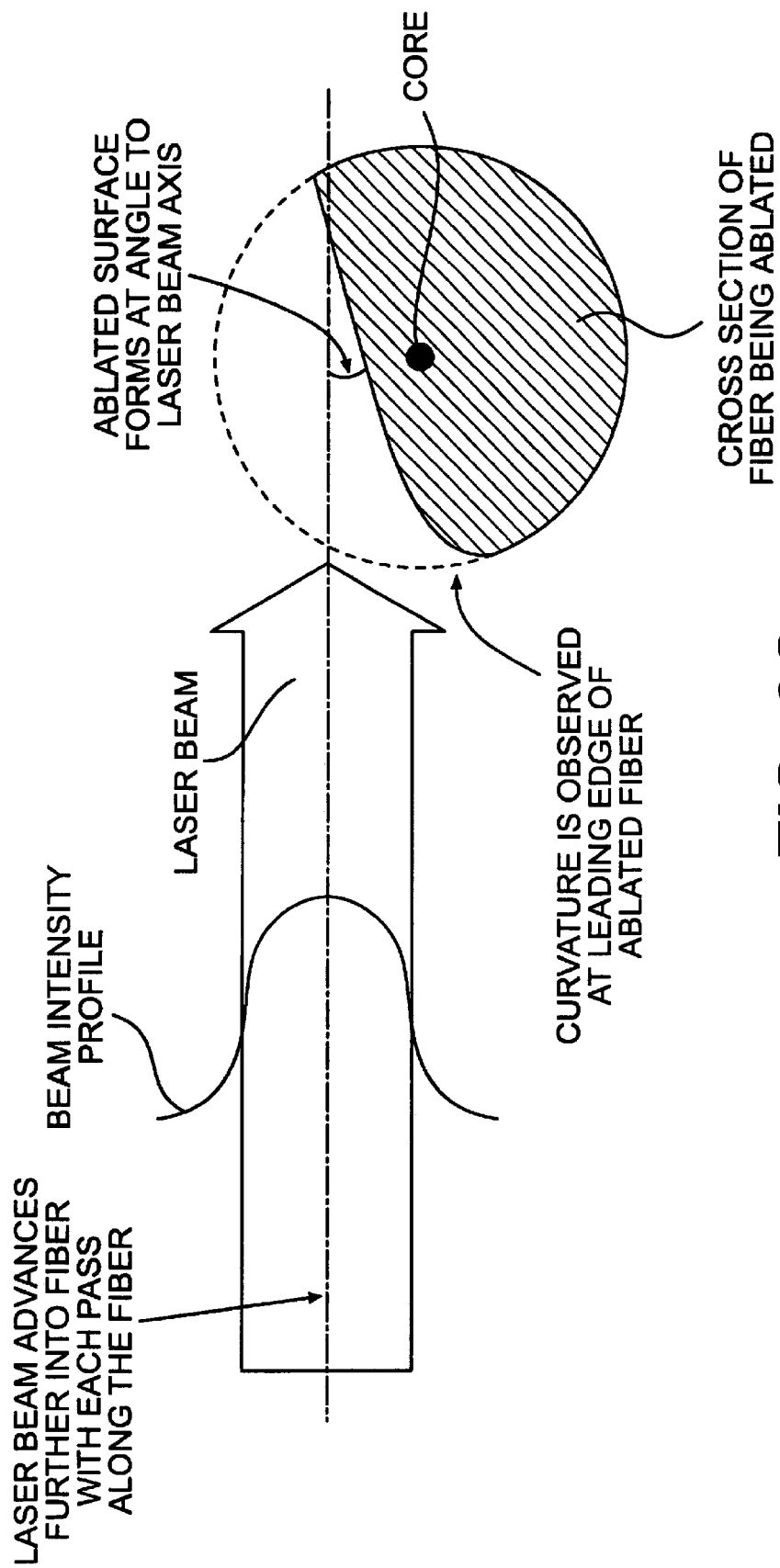

However, the side mill approach is not easily adaptable to multi-fiber ablation, because the resulting ablated surface is not precisely parallel to the laser beam axis. Instead, it is inclined at an angle determined by the peak power in the laser beam. This phenomenon is illustrated in FIG. 6C. This ablation angle makes it difficult to use the side mill approach to satisfactorily ablate multiple fibers such that all the ablated flats lie in the same plane. Thus, for multi-fiber ablation, as discussed further below, the "end mill" approach, shown in FIGS. 7A and 7B, is preferred.

The end mill approach uses the end 29 of the laser beam to ablate the cladding incrementally using multiple passes. The end mill technique generally yields a curved surface, as shown in FIG. 7B, instead of the planar surface that results from the side mill technique.

The ablation process preferably removes the cladding to within about 0–5 microns from the edge of the fiber core 30. The ablation depth is critical. When using the side mill technique, the ablation depth can be adequately controlled by, for example, mounting the substrate on a computer controlled precision stage that moves the fiber into the laser beam in small, controllable increments. However, measurement and control of ablation depth in the end mill approach requires a different technique, such as monitoring the optical throughput on the fiber, or direct measurement by means of a confocal microscope, precision comparator or similar method, as would be known to one skilled in the art.

Figure 9A:
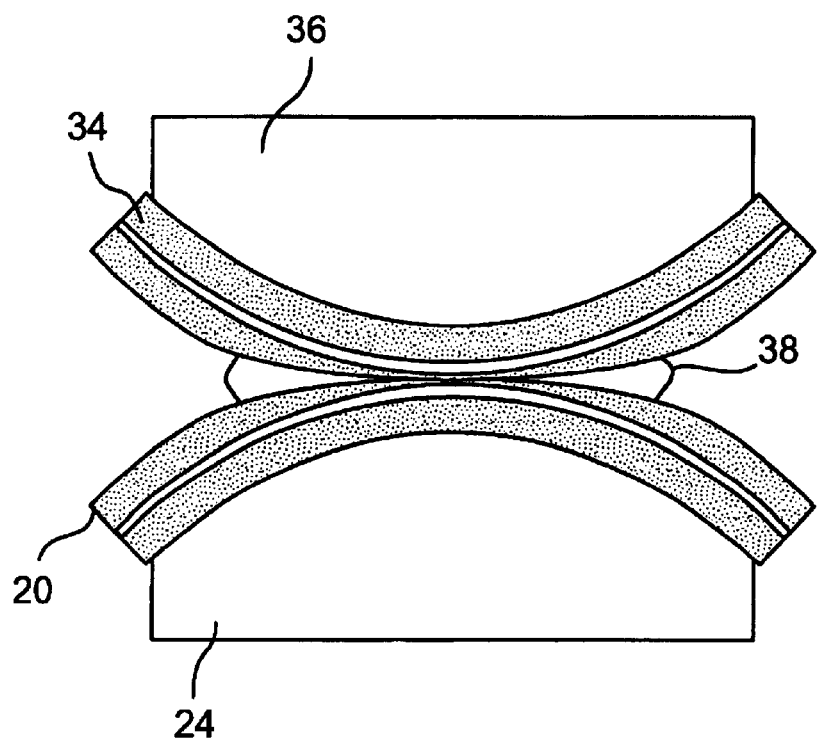
FIGS. 9A–10E illustrate an optical fiber coupler prepared according to the present invention.
Figure 9B:
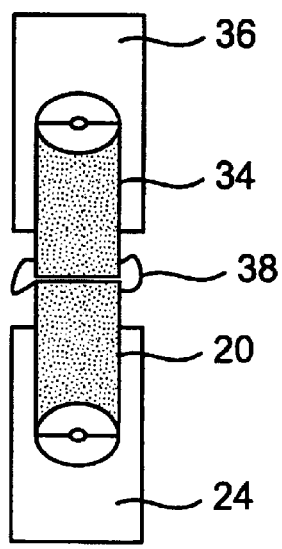

A second optical fiber 34 is prepared in substantially the same way as first optical fiber 20, using a second curved substrate 36 during the ablation process. An optical coupling material 38 is applied to the ablated region of either or both of first optical fiber 20 and second optical fiber 24. The coupler halves, i.e., first and second fibers 20 and 34, then are brought close together and aligned so that only a thin film of coupling material remains between them at "top dead center," as illustrated in FIGS. 9A–9B. The coupling material 38 should fill the area between the ablated portions of the coupler halves.

The coupling material 38 should have a refractive index identical to that of the fused silica fiber cladding. Suitable optical coupling materials include the sol-gels made by the Nye Optical Company of Fairhaven, Mass. Other materials might be suitable, as well. If the coupling material 38 index perfectly matches that of the cladding 26, the resultant structure is optically identical to that obtained by machining planar flats using the side mill approach (as shown in FIG. 6A) or by lapping. Thus, a coupler fabricated from coupler halves prepared using the end mill technique (thus having curved ablated surfaces) and using a proper coupling material 38 should have substantially the same optical performance as a coupler fabricated from coupler halves prepared using the side mill approach (thus having planar ablated surfaces). The end mill laser ablation approach, together with the index matching material 38, is a simpler way of getting close to the fiber core, particularly when working with ribbon fibers.

Figure 10A:
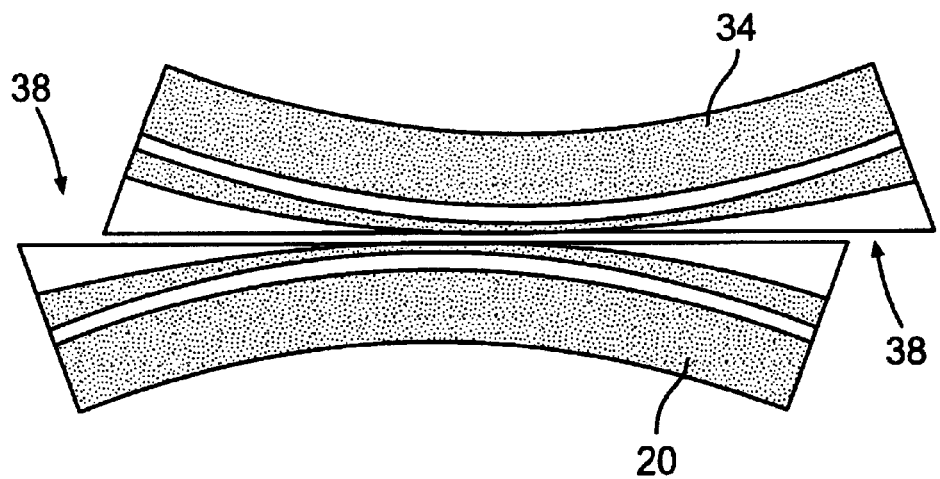
Figure 10B:
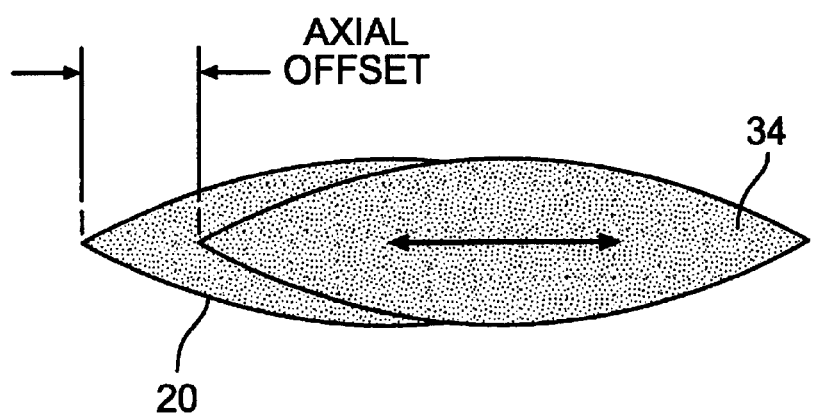
Figure 10C:
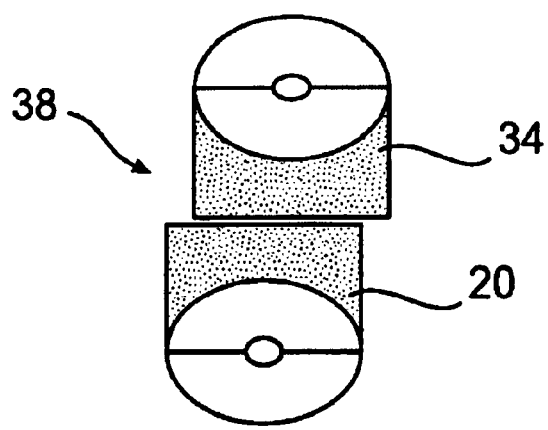
Figure 10D:
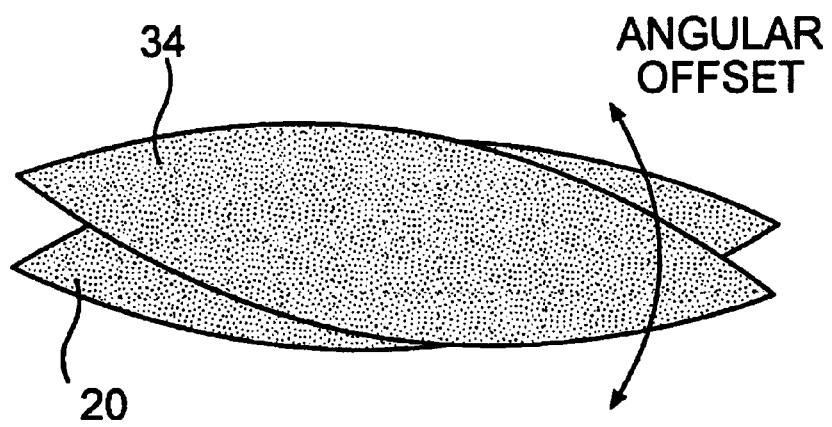
Figure 10E:
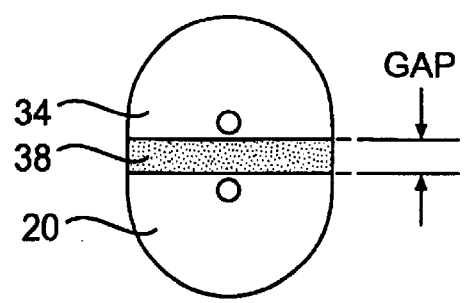

The coupling ratio, i.e., the fraction or percentage of light energy that is transferred from one fiber to the other, can be adjusted by lateral, axial, or angular offset of one fiber (or coupler half) with respect to the other. FIGS. 10A and 10B illustrate an example of an embodiment wherein first fiber 20 is axially offset from second fiber 34. FIG. 10C illustrates an example of an embodiment wherein first fiber 20 is laterally offset from second fiber 34. FIG. 10D illustrates an example of an embodiment wherein first fiber 20 is angularly offset from second fiber 34. The coupling ratio also could be adjusted by providing a gap between the coupler halves, as shown in FIG. 10D. The offsets shown in FIGS. 10A–10D and the gap shown in FIG. 10E are exaggerated for illustration. The canoe-shaped regions shown in FIGS. 10B and 10D represent what the ablated regions would look like, viewed head on, if the fiber is ablated while secured to a curved substrate, as described above. Alternatively, the coupling ratio could be adjusted by preparing the coupler halves in a non-symmetric manner (not shown). Finally, the coupling ratio could be adjusted using a combination of the foregoing techniques.

Figure 11:
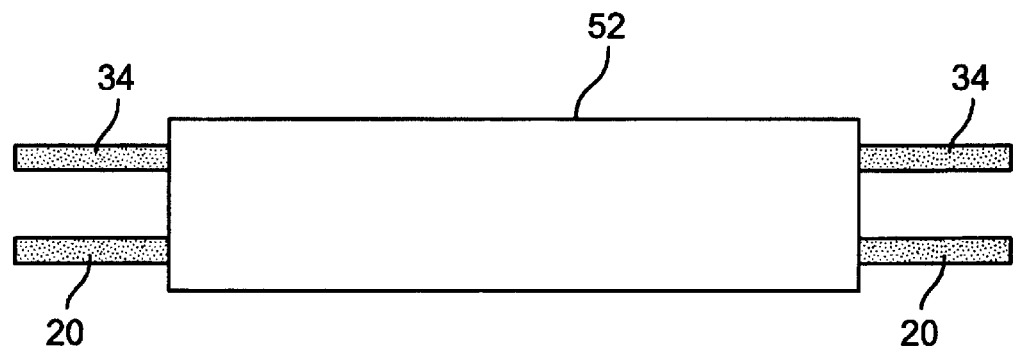
FIG. 11 illustrates an optical fiber coupler encapsulated in a protective sleeve.

In the preferred embodiment, the coupling ratio is set by transmitting light in one fiber (for example, first optical fiber 20) and monitoring the light coupled into the other fiber (for example, second optical fiber 34), while the alignment of the two fibers (i.e., coupler halves) is adjusted. When the monitored light indicates the desired power division, the coupling ratio is fixed by application of an adhesive or suitable mechanical device (not shown) that maintains the alignment of the two parts. In an alternate embodiment (not shown), an adhesive coupling material can be used to perform both the optical coupling function (otherwise performed by coupling material 38) and the fixing function. The resulting device can be packaged in a sleeve 52 or other suitable package to make it robust enough for normal handling, and to protect it from the environment, as illustrated in FIG. 11.

Fabrication of a ribbon fiber coupler, as discussed below and illustrated in the corresponding figures, involves processes similar to those described above in connection with a single fiber coupler. A six-fiber ribbon embodiment is discussed and shown for purposes of illustration, and for convenience only a segment of the ribbon is shown. In practice, however, a ribbon can include more or fewer than six fibers, and, of course, it can be shorter or longer than represented in the drawings. The fiber ribbon can be a standard commercial fiber ribbon, but preferably is made up of short fiber segments all from the same fiber spool. This increases the likelihood that the index profiles and the diameters of all the fibers in the ribbon are uniform, thus potentially yielding more uniform coupler performance across the ribbon array.

Figure 12:
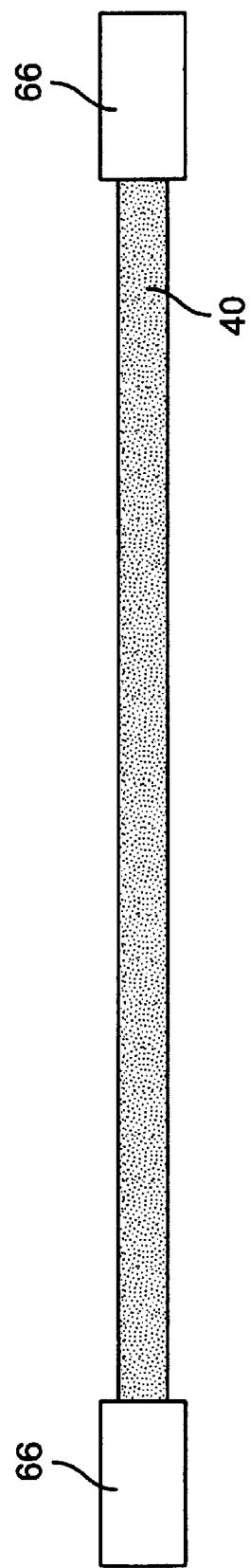
FIG. 12 illustrates an optical fiber ribbon segment having optical connectors installed at its ends.

In order to facilitate process monitoring during coupler fabrication, it is advantageous to first apply conventional or other ribbon connectors 66 to the ends of each ribbon segment (such as ribbon segment 40) to be used in fabricating the coupler,. as illustrated in FIG. 12. This allows the ribbon segments to be easily connected to a light source or monitor to facilitate adjustment of the coupler prior to final assembly, as discussed further below.

Figure 13:
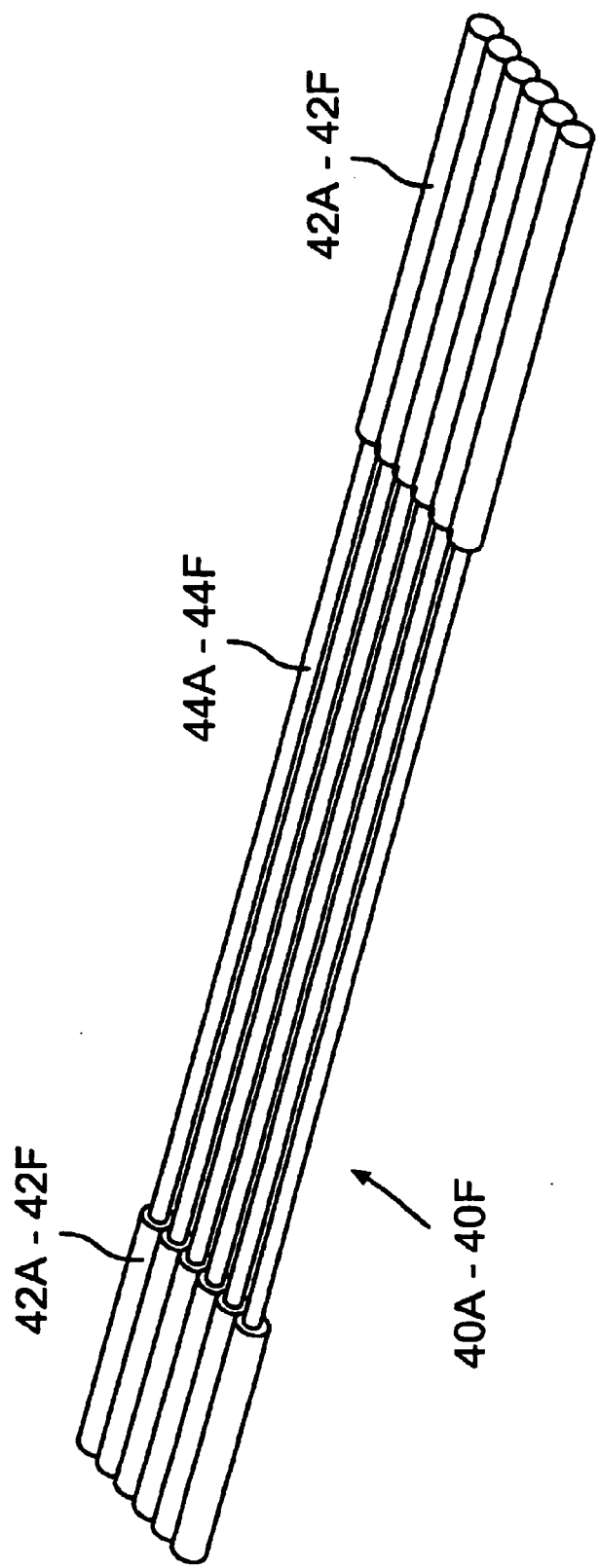
FIG. 13 illustrates an optical fiber ribbon, including a portion from which the protective coating has been removed.

The protective coating 42 covering each of the fibers 40A–40F comprising ribbon 40 must be removed to expose the bare glass fiber cladding 44A–44F over a sufficient length (on the order of several centimeters) of the fibers 40A–40F, as illustrated in FIG. 13. As in the single fiber embodiment, several methods exist for coating removal, including, among others, acid (such as hot sulfuric acid), hot gas (nitrogen or air), and use of a laser beam to ablate the protective coating away.

During the coating removal (i.e., stripping) process, ribbon 40 preferably would be held outboard of the region to be stripped by means of suitable fixturing and grippers (not shown). It may prove advantageous to place the ribbon into a small holder (not shown) to protect the bare fibers after stripping. A second fiber ribbon 50 having fibers 50A–50F is prepared in the same way.

Figure 14A:
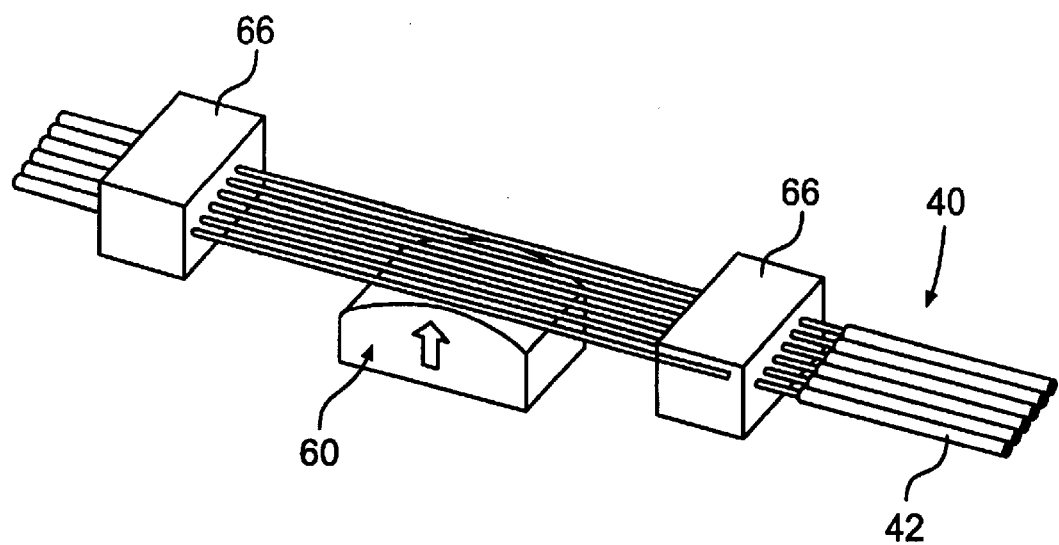
FIG. 14A illustrates a portion of a ribbon fiber, from which the protective coating has been removed, applied to a curved substrate, and further illustrates the use of precision spacers to space individual fibers apart from each other in a predetermined configuration.
Figure 14B:
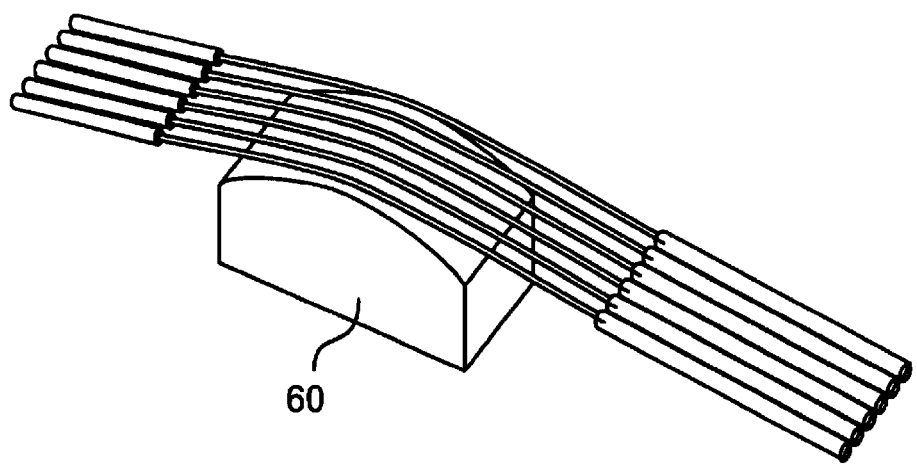
FIG. 14B illustrates a portion of a ribbon fiber, from which the protective coating has been removed, applied to a curved substrate.
Figure 16A:
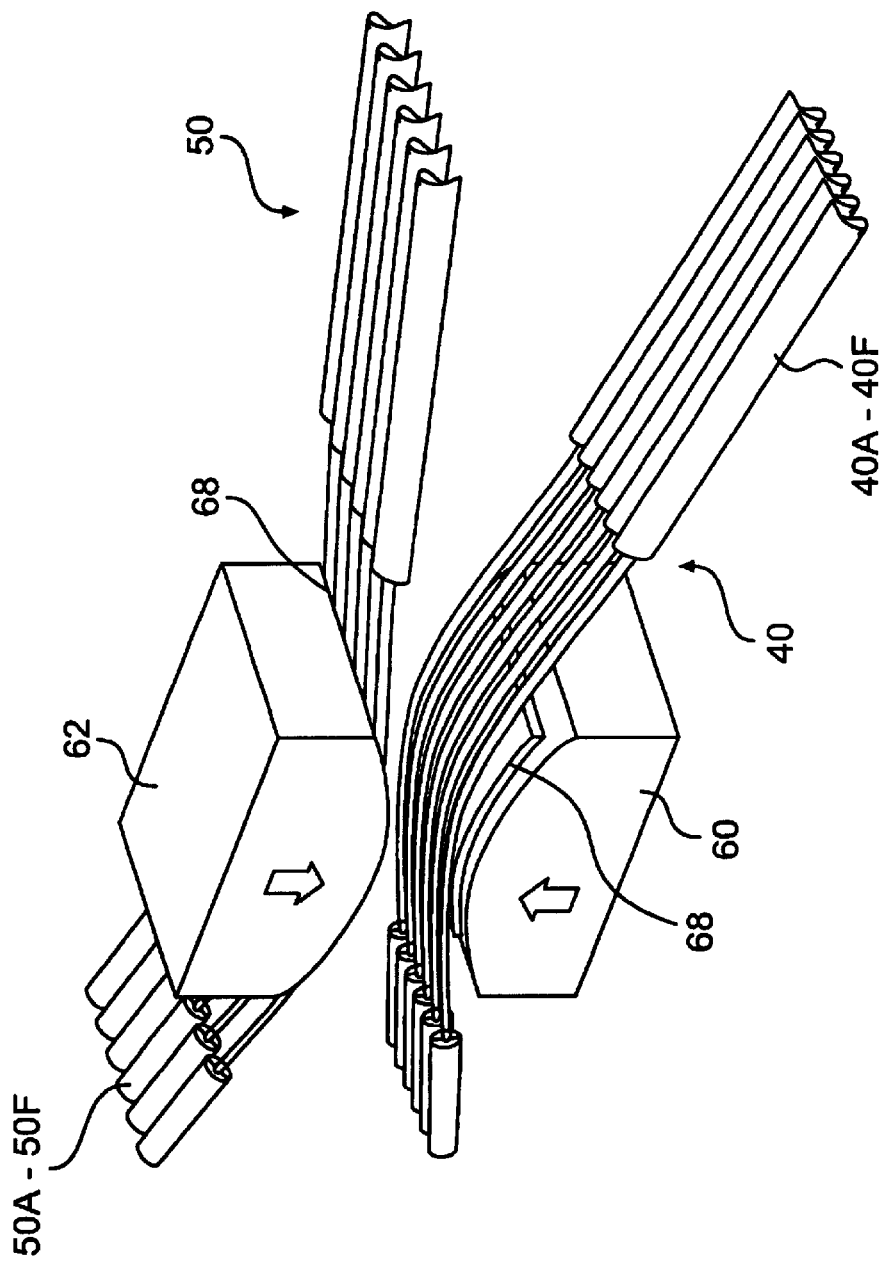
FIG. 16A illustrates first and second fiber ribbons with an optical coupling material placed between ablated portions thereof.
Figure 16B:
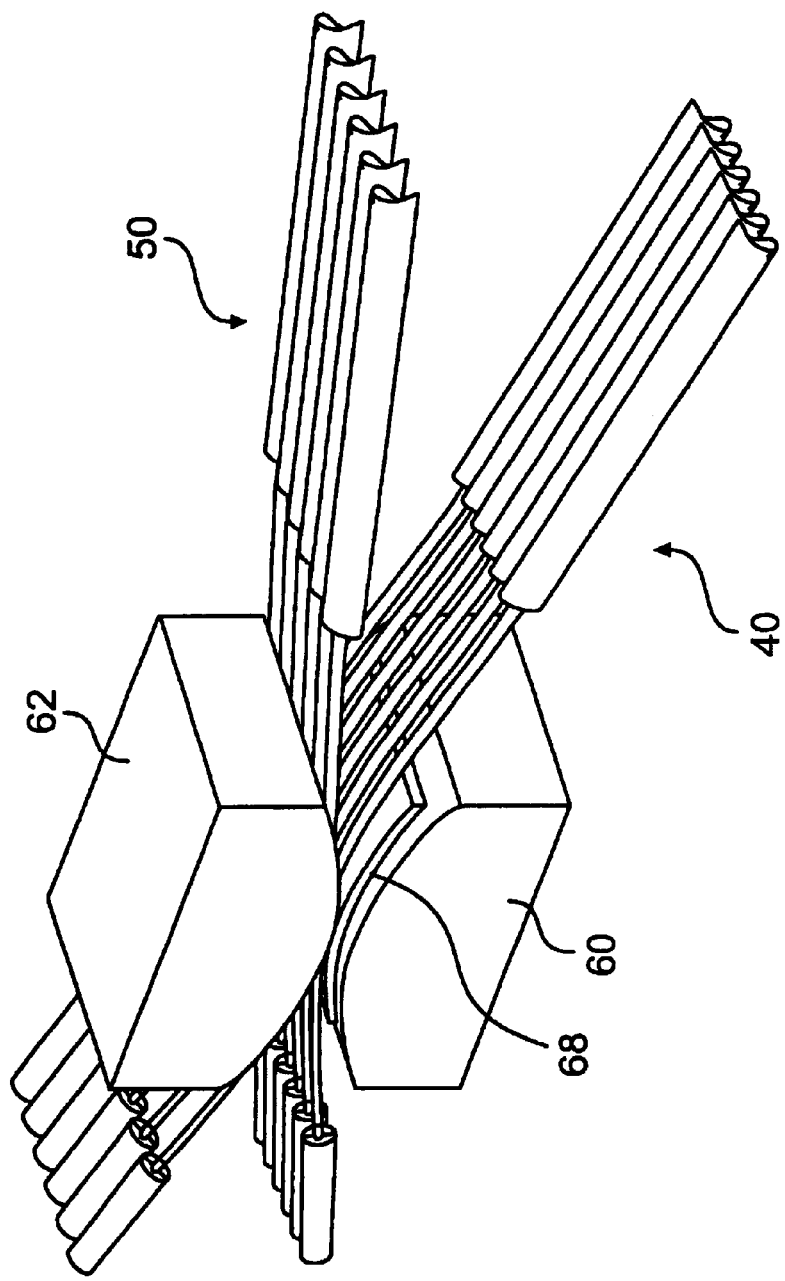
FIG. 16B illustrates a fiber ribbon coupler prepared according to the present invention.

Preferably, the stripped section of first ribbon 40 is mounted on a smooth surface of a first curved substrate 60, as shown in FIG. 14, and the stripped section of second ribbon 50 is mounted on a smooth surface of a second curved substrate 62 (see FIG. 16A). In order to achieve the best results, the individual fibers 40A–40F of ribbon 40 ultimately must be aligned with the corresponding fibers 50A–50F of second fiber ribbon 50, as shown in FIGS. 16A and 16B. In order to most easily achieve this alignment, it is essential that the fibers be precisely mounted on their respective substrates. The fibers should be parallel with precise spacing between them. Approximate spacing of the bare fibers can be accomplished simply by tensioning the ribbon after the protective coating has been stripped from the fibers, as described above. The fiber coating diameter for conventional optical fiber is nominally 250 microns. Thus, tensioning the ribbon after coating removal can be expected to yield nominal fiber spacing of about 250 microns.

However, in order to produce high-efficiency couplers with consistent performance among all of the fibers in the ribbon, the spacing must be more precise than that which typically can be obtained using the foregoing technique. In a preferred embodiment, the required precision can be achieved using commercially-available silicon v-groove chips having grooves spaced on 250 micron centers. FIG. 14A illustrates the use of pairs of v-groove chips 66 at each end of the region of ribbon 40 from which protective coating 42 has been removed. Such v-groove chips also can be used to temporarily secure the bare fibers 40A–40F and 50A–50F of first and second ribbons 40 and 50 to the smooth surface of the corresponding substrate 60, 62 and, thus, to effect the necessary alignments during fabrication of the coupler.

In order to achieve the best and most consistent results, this multi-fiber technique requires that each individual fiber 40A–40F and 50A–50F have identical characteristics and that the cladding 42A–42F and 52A–52F of each individual fiber is ablated to within the same distance from the edge of the core 44A–44F and 54A–54F thereof. The present invention takes advantage of the high-precision diameter control imposed during fiber manufacture to help assure all the fibers are ablated to the same depth. Precisely locating fibers 40A–40F and 50A–50F on corresponding, smooth, curved substrates 60A and 62 helps to assure that all of the fiber cores are parallel and the same distance from the respective substrate surface. If all of the fibers so mounted are ablated the same amount, the ablated surface of each fiber should be within the same distance from the core thereof.

Preferably, each curved substrate 60, 62 becomes part of the final ribbon coupler package. Thus, the stripped fibers preferably are adhesively bonded or otherwise affixed to the respective substrate 60, 62, preferably prior to ablation. For thermal compatibility, substrates 60, 62 preferably are made of a material, such as fused silica, having thermal properties that closely match those of the glass fiber. For example, each of substrates 60, 62 could be a section of a glass cylindrical lens. The material used to bond the fibers to the substrate should have similar thermal properties, as well. A glass-like sol-gel formulation is preferred, but other adhesives may be used as well.

Figure 15:
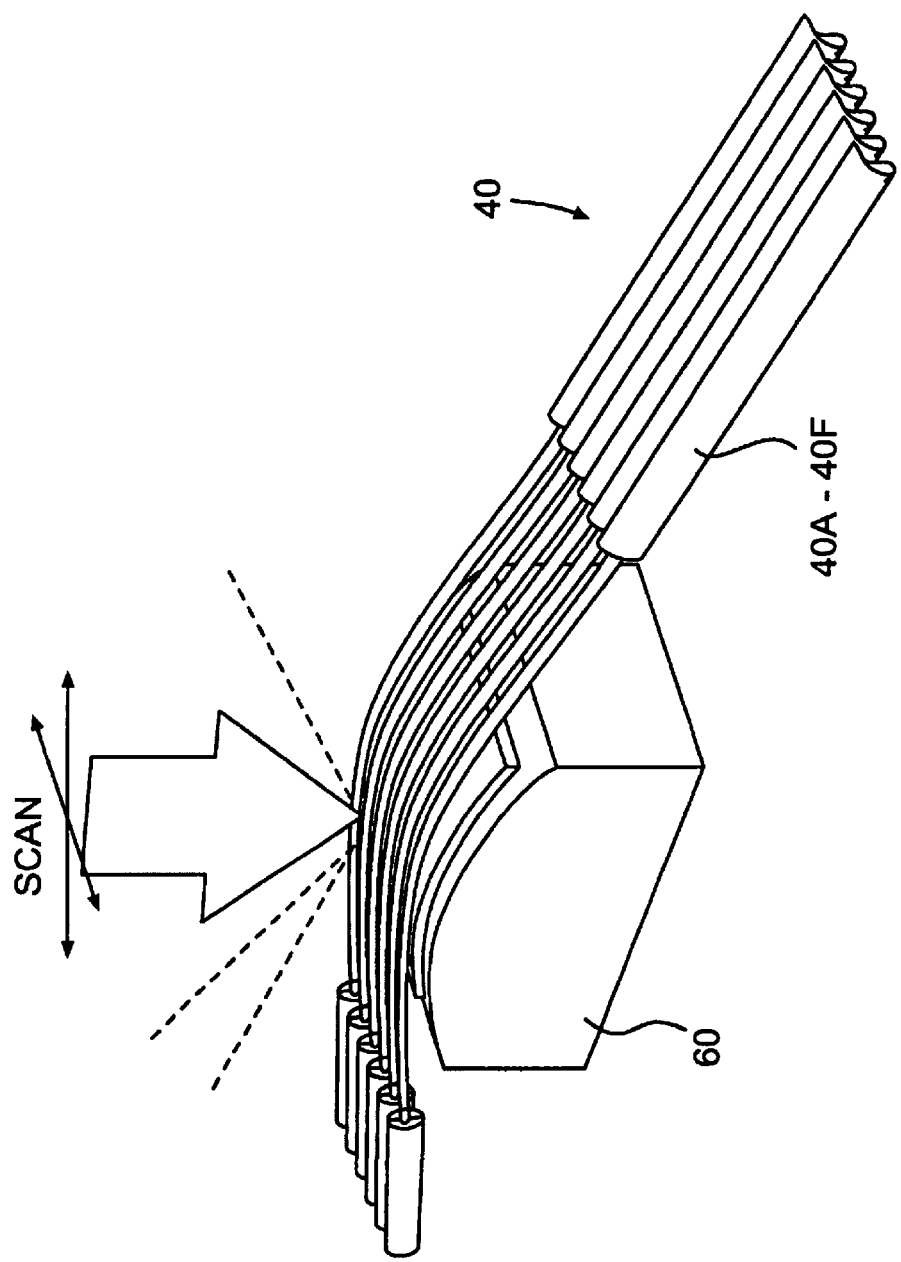
FIG. 15 illustrates the use of a laser beam to ablate the cladding from a portion of the individual optical fibers comprising a fiber ribbon.

As suggested above, each of the fibers should be ablated such that the same amount of cladding remains above the core of each of the fibers at the "top dead center" location thereof, as shown in FIG. 15. Using the end mill ablation technique, the ablated surfaces generally will not be planar, but rather will generally follow the curvature of the fibers along the curved substrate. Ablation can be performed one fiber at a time using a narrowly focused laser beam while monitoring the throughput on that fiber. It may be necessary to occasionally stop the ablation and press a compliant material with an appropriate index of refraction against the ablated surface to couple some light out to allow assessment of when the ablation has gone far enough.

As an alternative to ablating one fiber at a time, a more powerful laser with a beam width that spans all the fibers, e.g., by use of a cylindrical lens, could be used to ablate multiple fibers simultaneously. In a ribbon having twelve fibers on 250 micron centers, the total width of the array would be about 3 mm, and the longer dimension of the beam's cross section would need to span this width. With connectors installed on the fiber ends, as described above and shown in FIG. 12, it would be relatively easy to monitor the throughput on all the fibers simultaneously or to cycle through the array to monitor the ablation process. Although mechanical means could be used instead of lasers to ablate the fiber cladding, it is unlikely that conventional mechanical means, such as polishing or lapping, would yield uniform ablation depth across the array to the required precision. Therefore, laser ablation is preferred.

There are many potential algorithms for controlling the ablation while monitoring the throughput if the fibers are ablated simultaneously. If all or several of the fibers are monitored, the one showing the highest or lowest throughput loss could dictate when the ablation is halted. As another example, the process could be stopped when the average throughput over the monitored fibers exceeds a predetermined threshold.

After the ablation has been completed, first and second substrates 60 and 62 holding first and second ribbons 40 and 50 with ablated fibers 40A–40F and 50A–50F, respectively, are brought together with corresponding fibers opposite one another, as shown in FIG. 16A. FIG. 16A clearly illustrates one advantage of using curved substrates in the joining process. The curved substrates facilitate aligning the ablated portions of the fibers, while keeping the non-ablated portions of the fibers outboard of the coupling region, out of the way.

As in the single-fiber embodiment, a coupling medium 68 having a refractive index matching that of the fiber cladding is placed between opposing ablated surfaces of fibers 40A–40F and 50A–50F and the two coupler halves then are brought close together and aligned. An adhesive-type coupling material can serve to maintain the coupler halves in proper alignment over time and through environmental changes. Sol-gels have proven to function satisfactorily after high-temperature excursions. Alternatively, conventional index materials such as an epoxy or polyurethane are expected to yield satisfactory results. In other embodiments, the index matching material could be used only in the optical interaction region between the ablated portions of the fibers and an adhesive applied between other parts of the structure to "fix" the alignment.

Prior to curing the adhesive, the alignment of the coupler halves is adjusted to obtain the desired coupling ratio across the array of couplers. The alignment can be controlled by monitoring the coupling ratio in all or some of the couplers. Again, several potential control algorithms can be imagined. For example, if all or several of the couplers are monitored, the "hottest" or the weakest coupling could dictate acceptable alignment. In most test and access applications, the coupling ratios across the array should probably be similar, but need not be identical, as long as the coupler array is fully characterized (i.e., variations between individual couplings are known and accounted for). For example, in system monitoring applications where a low coupling ratio is appropriate, the coupling ratios across the array need only be approximately the same, e.g., 5–10%. As discussed in connection with the single-fiber embodiment, the resulting device can be packaged in a sleeve or other suitable package (not shown) to make it robust enough for normal handling, and to protect it from the environment. Depending on the intended end use, the connectors on the ribbon ends could be left in place or cut off.

The foregoing description is merely illustrative of the present invention. Those skilled in the art will recognize that modifications and variations thereto can be implemented without departing from the spirit of the invention, the scope of which is defined by the claims appended hereto.

We claim:

1. A method of optically coupling a first optical fiber to a second optical fiber, each of said first and second optical fibers comprising cladding and a core, said method comprising the steps of:

ablating a portion of the cladding from a portion of said first optical fiber using a laser side milling process so that the core of said first fiber is nearly exposed;

ablating a corresponding portion of the cladding from a portion of said second optical fiber so that the core of said second fiber is nearly exposed;

orienting the ablated portion of said first optical fiber in closed proximity to the ablated portion of said second optical fiber;

placing an optical couplant material between the ablated portion of said first optical fiber and the ablated portion of said second optical fiber; and securing the position of said first optical fiber with respect to the position of said second optical fiber.

2. The method recited in claim 1 wherein said step of ablating is accomplished using a laser beam.

3. The method recited in claim 2 wherein said step of ablating is accomplished using the end of a laser beam.

4. The method recited in claim 1 further comprising the step of affixing at least a part of the ablated portion of said first optical fiber to a substrate.

5. The method recited in claim 4 wherein said substrate is curved.

6. The method recited in claim 1 further comprising the step of encasing said first optical fiber and said second optical fiber in a protective medium.

7. The method recited in claim 1 wherein said step of orienting is conducted so as to achieve a predetermined power division between said first optical fiber and said second optical fiber.

8. The method recited in claim 7 wherein the ablated portion of said first optical fiber is axially offset from the ablated portion of said second optical fiber.

9. The method recited in claim 7 wherein the ablated portion of said first optical fiber is laterally offset from the ablated portion of said second optical fiber.

10. The method recited in claim 7, wherein the ablated portion of said first optical fiber is angularly offset from the ablated portion of said second optical fiber.

11. A method of optically coupling a first plurality of optical fibers to a second plurality of optical fibers, comprising the steps of:
   ablating the cladding from each of said first plurality of fibers using a laser side milling process;
   ablating the cladding from corresponding ones of said second plurality of optical fibers;
   orienting the ablated portions of selected ones of said first plurality of optical fibers in a predetermined relationship with the ablated portions of corresponding selected ones of said second plurality of optical fibers;
   placing an optical coupling material between the ablated portions of each of said first plurality of optical fibers and the ablated portions of each of said second plurality of optical fibers; and
   fixing the position of said first plurality of optical fibers with respect to said second plurality of optical fibers.

12. The method recited in claim 11 further comprising the step of attaching an optical connector to an end of selected ones of said first plurality of optical fibers.

13. The method recited in claim 11 wherein said step of ablating is accomplished using the end of a laser beam.

14. The method recited in claim 11 further comprising the step of affixing at least part of the ablated portions of said first plurality of optical fibers to a substrate.

15. The method recited in claim 14 wherein said substrate is curved.

16. The method recited in claim 11 further comprising the step of encasing said first plurality of optical fibers and said second plurality of optical fibers in a protective medium.

17. The method recited in claim 11 wherein said step of orienting is conducted so as to achieve a predetermined power division between at least one of said first plurality of optical fibers and a corresponding on of said second plurality of optical fibers.

18. The method recited in claim 17 wherein the ablated portion of said at least one of said first plurality of optical fibers is axially offset from the ablated portion of said corresponding one of said second plurality of optical fibers.

19. The method recited in claim 17 wherein the ablated portion of said at least one of said first plurality of optical fibers is laterally offset from the ablated portion of said corresponding one of said second plurality of optical fibers.

20. The method recited in claim 17 wherein the ablated portion of said at least one of said first plurality of optical fibers is angularly offset from the ablated portion of said corresponding one of said second plurality of optical fibers.

* * * * *